United States Patent
Buskirk, Jr.

(10) Patent No.: US 6,178,183 B1
(45) Date of Patent: *Jan. 23, 2001

(54) METHOD AND APPARATUS FOR RECEIVING CONVENTIONAL TELEPHONE CALLS WHILE CONNECTED TO THE INTERNET

(75) Inventor: Martin Cornelius Buskirk, Jr., Raleigh, NC (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/861,295

(22) Filed: May 21, 1997

(51) Int. Cl.7 .............................. H04L 12/66; H04M 3/42
(52) U.S. Cl. ...................... 370/493; 370/270; 370/352; 379/93.09; 379/202; 379/219
(58) Field of Search ................... 310/260, 263, 310/264, 270, 352, 355, 389, 493; 379/201, 202, 93.01, 93.09, 93.21, 158, 215

(56) References Cited

U.S. PATENT DOCUMENTS

| | | | | |
|---|---|---|---|---|
| 5,608,786 | * | 3/1997 | Gordon | 379/201 |
| 5,625,677 | * | 4/1997 | Feiertag et al. | 379/93 |
| 5,764,736 | * | 6/1998 | Shachar et al. | 379/201 |
| 5,805,587 | * | 9/1998 | Norris et al. | 370/352 |
| 5,892,764 | * | 4/1999 | Riemann et al. | 370/389 |
| 5,982,774 | * | 11/1999 | Foladare et al. | 370/401 |

* cited by examiner

*Primary Examiner*—Chi H. Pham
*Assistant Examiner*—Frank Duong
(74) *Attorney, Agent, or Firm*—Jeanine S. Ray-Yarletts; Marcia L. Doubet

(57) ABSTRACT

The present invention enables a user, logged on to a data network over a traditional telephone line, to be notified of incoming calls over that same line without interruption of the data session. In addition, the user can accept the incoming call without terminating the data session. The user is also able to provide communication between the incoming call and the data session such that, voice over the data session can be conferenced into voice over the incoming telephone line.

14 Claims, 7 Drawing Sheets

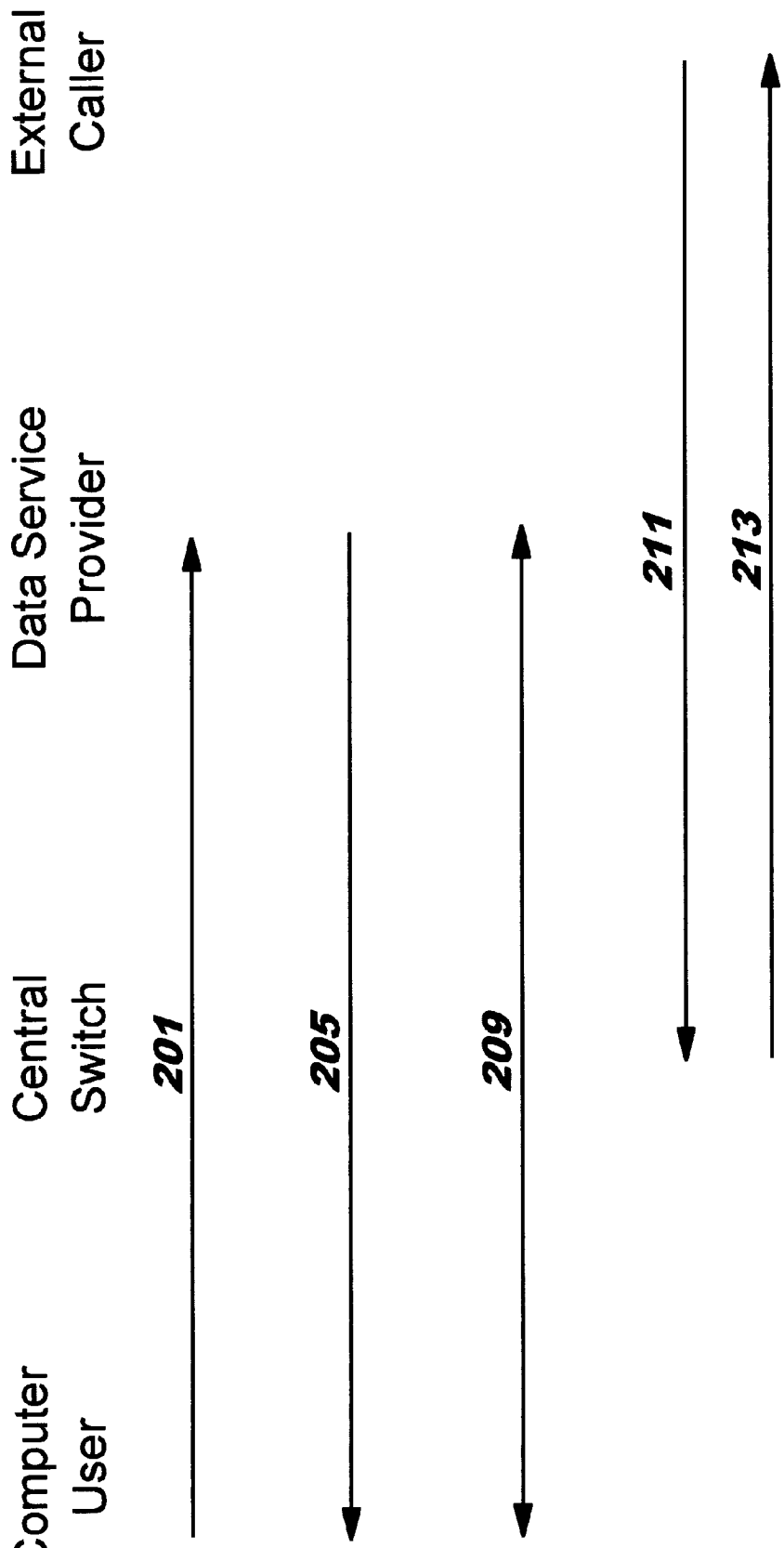

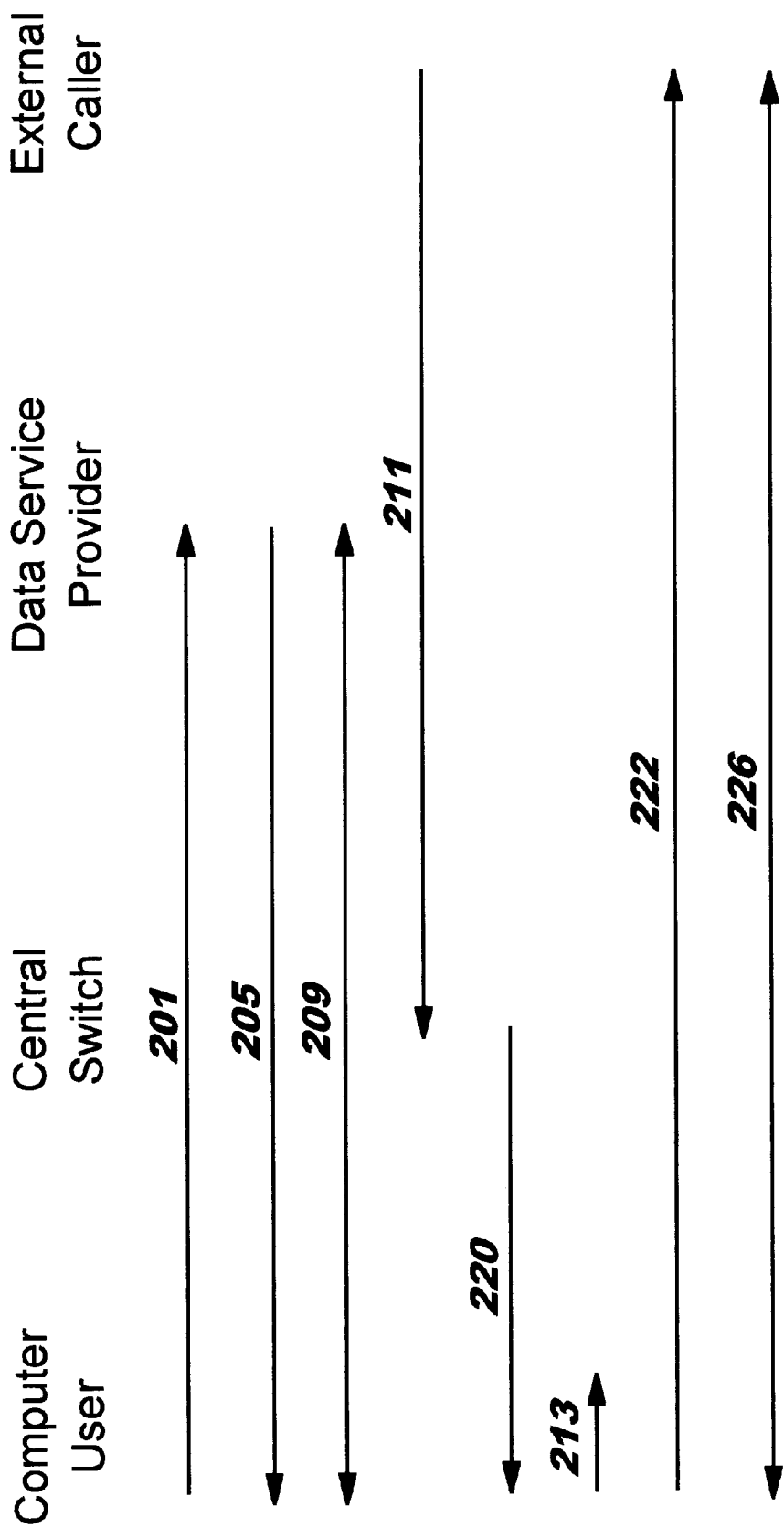

METHOD AND APPARATUS FOR RECEIVING CONVENTIONAL TELEPHONE CALLS WHILE CONNECTED TO THE INTERNET

RELATED INVENTIONS

IBM application Ser. No. 08/853,231 entitled "A Method and Apparatus for Placing Telephone Calls While Connected to the Internet" filed May 21, 1997.

FIELD OF THE INVENTION

The present invention relates in general to a communications system allowing incoming communications to notify the recipient without disrupting ongoing communications. In specific, this invention describes a method and apparatus for receiving external interrupts without disrupting existing data communications protocols.

BACKGROUND OF THE INVENTION

With the explosive growth of the Internet, multitudes of users are connecting to the Internet through their phone lines. While many businesses allow for dedicated phone lines to their computers and different dedicated lines for voice communications, many smaller businesses and home users cannot afford the expense of a dedicated phone line. If a user chooses to use their voice phone line for their Internet communications, while the person is logged on to the Internet (or any other form of data communications) the phone will ring busy if anyone tries to call the phone number being used for the outgoing connection. This can be problematic since access to online services and online providers often results in intervals of long duration in which the user is logged on to the communication provider. This means long intervals where the phone line will ring busy if someone is trying to reach the user over a conventional telephone. In addition, using the existing technologies, someone desiring to place a call while logged on to a data network would cause the data portion of the line to time-out due to inactivity while the user toggled to the other session using 3-way calling or similar technology.

In theory, this is solved by 'call waiting' in that a user who is talking on the phone will hear a tone if someone else is trying to reach them. This is not the case where the initial usage is with a data service provider which sends and receives all messages as tones. Since the data service will receive the 'call waiting' tone as part of the message, most applications will terminate with fatal or unrecoverable errors if a 'call waiting' interrupt comes in while a data communication session is established causing the workstation to hang-up on the call with the data service provider. While this may allow the user to receive incoming calls, it is not desirable to force the user off the data communications session to be notified of the incoming call. The user should have a choice as to whether they are going to receive the incoming call without disconnecting them from the data communications network to which they are connected.

OBJECTS OF THE INVENTION

It is an object of the present invention to allow a user logged onto a data network over a conventional telephone network to be informed of incoming calls without being forced off of their data network.

It is a further object of the present invention to allow the user to choose to answer the incoming call or ignore the incoming call without disrupting the communications of the data network.

It is yet a further object of the present invention to allow concurrent conversations of voice for the incoming call and voice and/or data over the existing data communications physical transport (telephone wire or wireless path).

It is yet a further objective of the present invention to allow the user to do a multitude of additional telephone functions such as putting one call on hold while accepting a second incoming call, alternating between the calls, and conferencing the calls.

SUMMARY OF THE INVENTION

The present invention provides a method and system of allowing communication over an existing telephone line (such as a public switched telephone network or PSTN or any voice switch) using a data communications provider and known transmission media, such as traditional analog or digital phone lines or cellular transmission, while enabling a user receiving the communications to be notified if an incoming caller is attempting to reach the user or to establish additional connections over the same physical link. The method comprises the establishment of three channels, the original data service channel, a channel which will be referred to for purposes of this invention as a control channel, and a voice quality channel for incoming and outgoing voice switch calls. All of the channels are routed to a 'black box' which could be implemented as a portion of the central office switch or independent of the switch. This 'black box' provides a multiplexer/demultiplexer function which allows the user to receive the messages from the caller interspersed with the information being received from the data service provider. This is extremely interesting with respect to the Internet and the Internet service providers. It allows multiplexing of voice, data, video or other information using ATM or IP with RSVP protocols. This results in the ability to merge the PSTN with packet switch technology in a manner controlled by the end user of the workstation or sending terminal.

BRIEF DESCRIPTION OF THE DRAWINGS

FIG. 2A is a flow diagram of the current flow where the user has a conventional telephone connection and does not have call waiting.

FIG. 2B is a flow diagram of the current flow where the user has a conventional telephone connection and does have call waiting.

DETAILED DESCRIPTION OF THE PREFERRED EMBODIMENT

The detailed description of the preferred embodiment is implemented using the TCP/IP protocol although any packet based protocol can be used without modifying the invention. The preferred embodiment utilizes simultaneous voice and data technology where voice is given precedence over data transmissions, local Internet Protocol (IP) routing, a computer telephony interface (CTI) server connected to the central office switch and a CTI client on an end user's multimedia workstation with a 'black-box' multiplexer/demultiplexer which handles (1) a control channel to the CTI server (2) the original dial-up connection data (i.e. using the channel), and (3) a voice using the stream containing the PSTN voice (i.e. the voice quality channel). It provides a peer to peer CTI link carrying control information between a CTI server and workstation applications, through a multiplexer/demultiplexer, herein after referred to as the control channel. While the preferred embodiment differentiates between voice and data, it will be easily understood by one skilled in the art that any information may be sent over the channels, including but not limited to voice, data and video. In addition, the preferred embodiment contains an association between the originating number of the dial-up connection, the corresponding terminating telephone number or port address on the multiplexing device, and a central office telephone line address corresponding to the termination of the external call on the multiplexing device. Utilizing the preferred embodiment of the present invention, a user can be alerted to the fact that they have an incoming call, is given choices as to how to handle the incoming call such as answering the call and using the workstation sound card and microphone as the telephone instrument while remaining connected to the Internet and continuing to simultaneously talk and do work on the world wide web. Likewise, the user of the present invention is able to make an outgoing call while concurrently accessing the Internet, as well as invoking conventional telephone functions such as conference calling and placing a call on hold. The preferred embodiment also refers to only two concurrent sessions. The technology divulged in the present invention makes it obvious to one skilled in the art how to extend this invention to more than two concurrent sessions.

Figure 1:
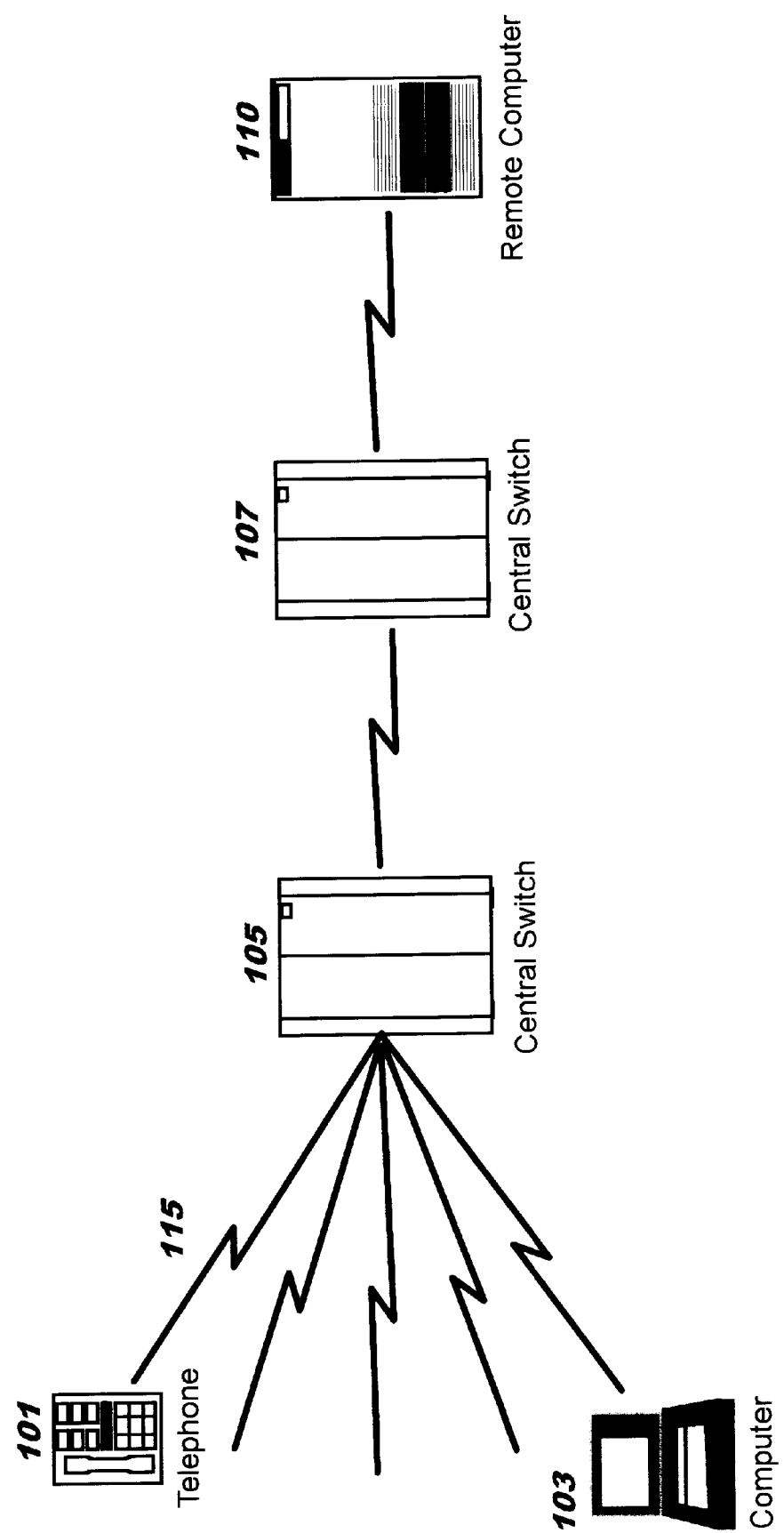
FIG. 1 is an overview of a present network configuration.

FIG. 1 depicts a network configuration in which a computer 103 is connected to a remote computer such as an Internet provider 110 by way of one of a multitude of conventional telephone lines 115 where the telephone lines 115 are connected to a central office or public switch 105 which in turn is connected to the remote computer 110 through a central office switch 107 associated with the remote computer. In this simplified example of data devices using the telephone network, if a traditional telephone user 101 attempts to contact the computer user 103 who, in turn, is accessing the remote computer 110, the central office switch 105 associated with the computer user 103 will detect that the line to the requested computer 103 is busy. This will result in the central office switch 105 sending a busy signal to the caller 101. Alternatively, the central office switch 105 might send a call waiting interrupt tone to the requested computer 103 which is an in-band frequency that is interpreted by the requested computer 103 as corrupted data from the remote computer 110 (since the requested computer 103 does not understand the call waiting tone) and the session between the remote computer 110 and the requested computer 103 is terminated due to its perceived corruption.

FIG. 2A depicts the prior art flows between the components in the network of FIG. 1 when a caller attempts to call a telephone number which is currently logged on to a data network such as the Internet. The user of the calling computer 103 sends a message 201 to the Data Service provider 110 by way of the central switches for the calling computer 105, the central switch for the data service provider 107 and any other intermediate switches. The message 201 sent by the calling computer 103 requests the establishment of a session between the calling computer 103 and the data service provider 110. The data service provider 110 then sends a positive response 205 to the calling computer by way of the central office switch 105 for the calling computer and the central office switch 107 for the data service provider confirming the establishment of the session. From that point information flows freely 209 between the two computers over the session that has been established between them.

When an external caller 101 places a call to the requesting computer 103, a request 211 is made from the external caller's switch to the central office switch 105 of the requesting computer to establish a session with the requesting computer 103. The central office switch 105 checks the connection to the requesting computer 103 and detects that the line (or telephone number) is already in use, therefore the central office switch 105 sends a busy indication 213 back to the external caller's switch. At this point, the external caller 101 is not permitted access to the requesting computer 203.

As is shown in FIG. 2B, the scenario is slightly different if the telephone line which the requesting computer is using supports call waiting. In FIG. 2B, the flows are the same as in FIG. 2A while establishing the session between the requesting computer 103 and the remote computer 110. Once the session 209 has been established, if the line the requesting computer 103 is using supports call waiting, when the external caller's switch sends a message 211 to the central office switch for the requesting computer 105 requesting to connect to the requesting computer 103, the central office switch for the requesting computer 105 sends a call waiting tone 220 to the requesting computer 103. The requesting computer 103, responding to what it interprets as a corrupted transmission from the remote computer 110, hangs up 213 which terminates the session with the remote computer. The requesting computer 103 is then available to answer the call 222 from the external caller 101 and establish a communications session 226 if the requesting computer is equipped to accept an incoming call using call waiting. This is definitely undesirable in that the user did not intend to terminate the session with the data service provider at this time. The user may have taken considerable time and expense to navigate to where he was in the databases of the data service provider and that information may be very difficult to replicate. For that reason, many data service providers strongly urge their users not to subscribe to call waiting.

Figure 3:
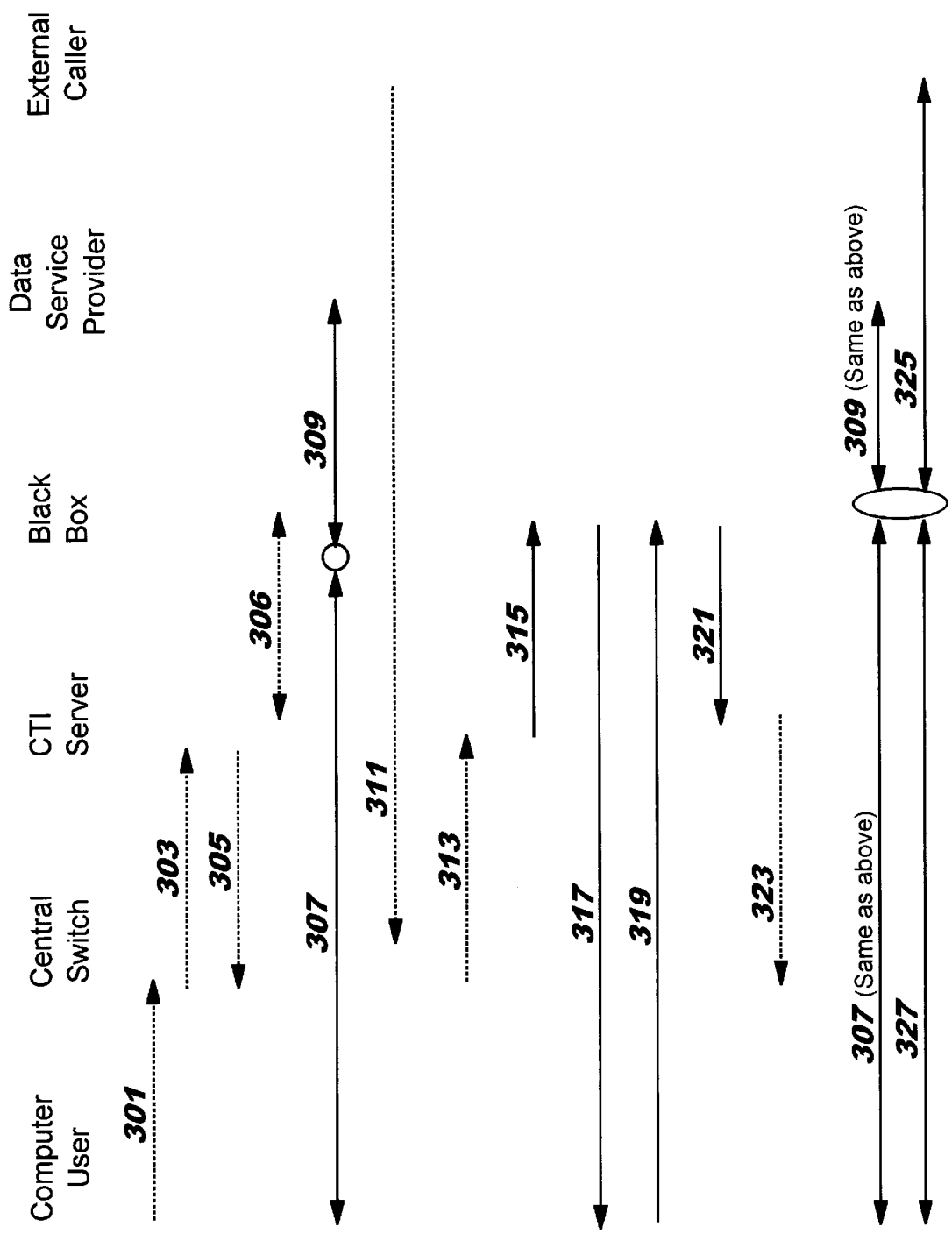
FIG. 3 is a flow diagram of the flow of information between a computer user accessing a remote computer system and an incoming caller using the present invention.

FIG. 3 depicts the flow of information between a computer user accessing a computer data network over a telephone line and an incoming call using the present invention. Using the present invention, a black box 407 (see FIG. 4) is placed either inside of or next to the central office switch and a CTI Server 405 is attached to or part of the Central Office Switch. A communications link is established between the black box 407 and the CTI server 405. Matching SVD (simultaneous voice and data) technology is present in the workstation 401 and the black box such that multiple channels (3 or more) can be dynamically or statically established over the path between them. This black box, the CTI Server, and the various communications connections will be described further with respect to the following figures. In addition, the devices referenced in the description of FIG. 3 are visually apparent in FIG. 4.

When the computer user at workstation 401 executes a dial 301 to the central switch for connectivity to the data service provider, the central switch 403 issues a request 303 to the CTI server 405 requesting that the CTI server 405 provide the central switch with instructions as to what to do with the dialing request. The CTI server 405, knowing that this is a request to a service provider 413, instructs the switch 403 to redirect the call to a telephone number representing a free port on the black box 407. (Note, there can be a dialog 306 between the CTI Server 405 and the black box 407 to determine the appropriate terminating port and associated telephone number). The black box 407 will then establish the path to the service provider 413 and information will flow freely between the computer workstation 401 and the service provider 413. Flow 307 represents the flow between the black box 407 and the workstation 401 through the central office switch 403. Flow 309 represents the flow between the data service provider 413 and the black box 407. The black box 407 also establishes a control channel 317 and a voice channel 327 with the workstation 401.

When an external caller 411 dials the requesting computer 401, a request 311 is made from the external caller's switch to the central office switch 403. The central office switch 403 sends a request 313 to the CTI server 405 to provide it with instructions on what to do with the dialing request. The CTI server 405, knowing the status of the workstation 401 connectivity, sends a request 315, through the black box, over the control channel 317, to the workstation 401 for instructions as to what to do with this call along with information as to who is calling. The end user's choice of what to do with the call 319, 321 is forwarded from the workstation 401 through the black box 407 to the CTI server 405 over the control channel. If the choice is to accept the call, the CTI server 405 instructs 323 the central switch 403 to redirect the call to a specific telephone number or port id on the black box 407 that will terminate the call from the external caller 411. Either the black box 407 or the CTI server 405 will answer the call on behalf of the computer user 401. (Note, there can be a dialog between the CTI Server 405 and the black box 407 to determine the appropriate terminating port and associated telephone number). The black box 407 will begin multiplexing the voice over the voice channel 327 together with the current service provider data on the data channel 307, and the computer user 401 can begin speaking with the external caller 411 using the microphone, speaker and sound card in the workstation 401, while the computer user 401 simultaneously continues to communicate 307 with the data service provider 413 using the keyboard and display of the workstation 401.

Figure 5:
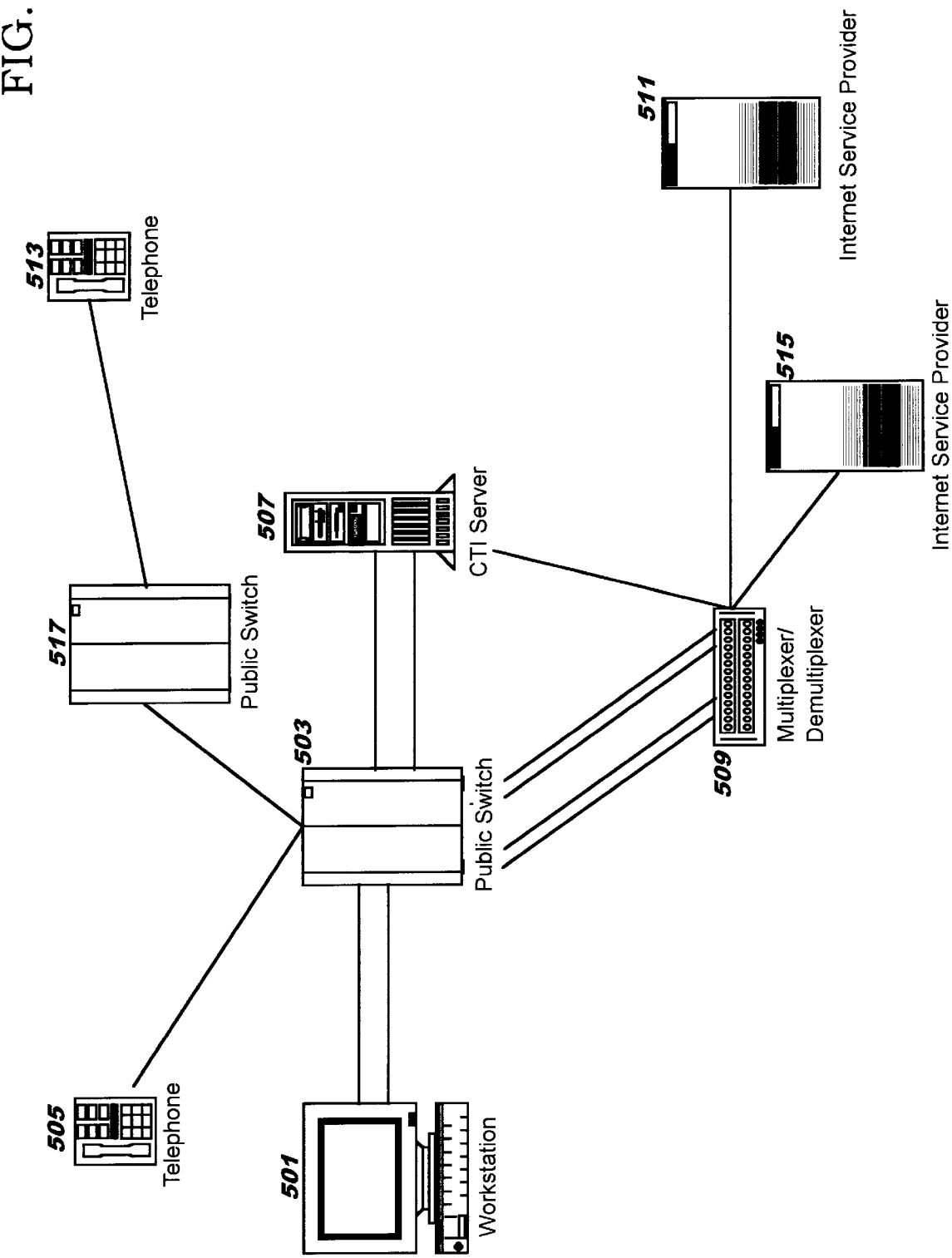
FIG. 5 is a diagram of a system comprised of a multitude of connections utilizing the present invention.
Figure 6:
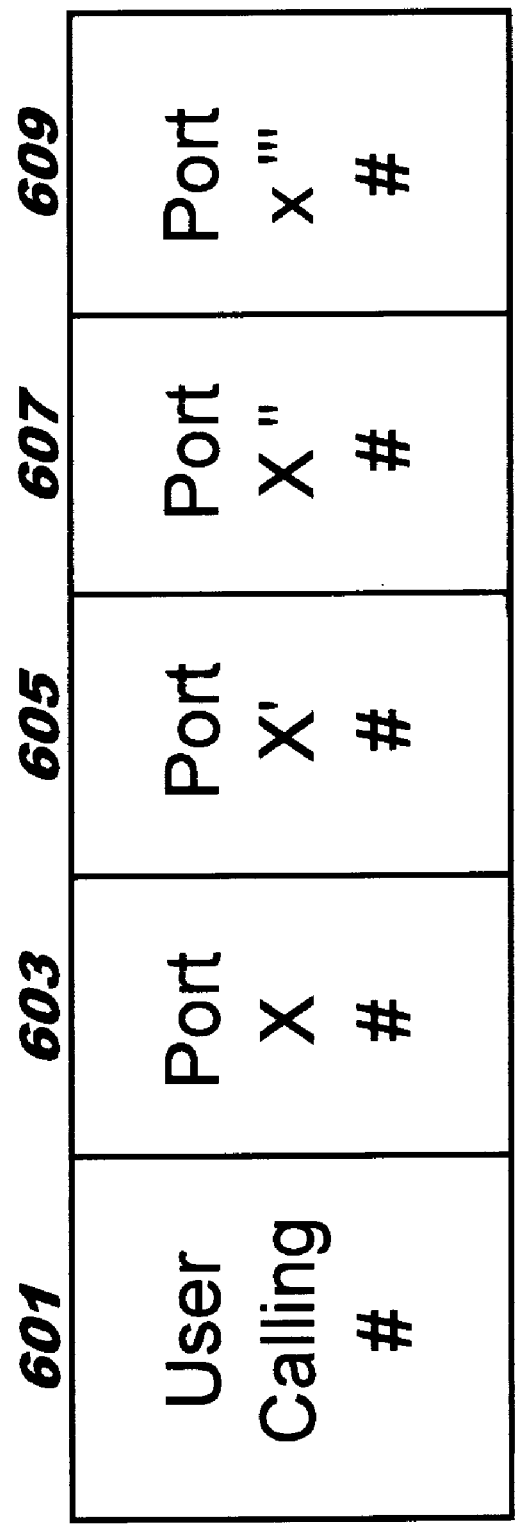
FIG. 6 is a graphical representation of the port associations made in the CTI server of the preferred embodiment.

The above example of the preferred embodiment can, using the same methodology, be extended to handle additional incoming and outgoing calls. This is done by multiplexing additional telephone numbers associated with the requesting computer's telephone number. A graphical representation of two incoming telephone calls and two outgoing data sessions is shown in FIG. 5. FIG. 6 depicts the organization in the CTI server of the port associations supporting FIG. 5.

Figure 4:
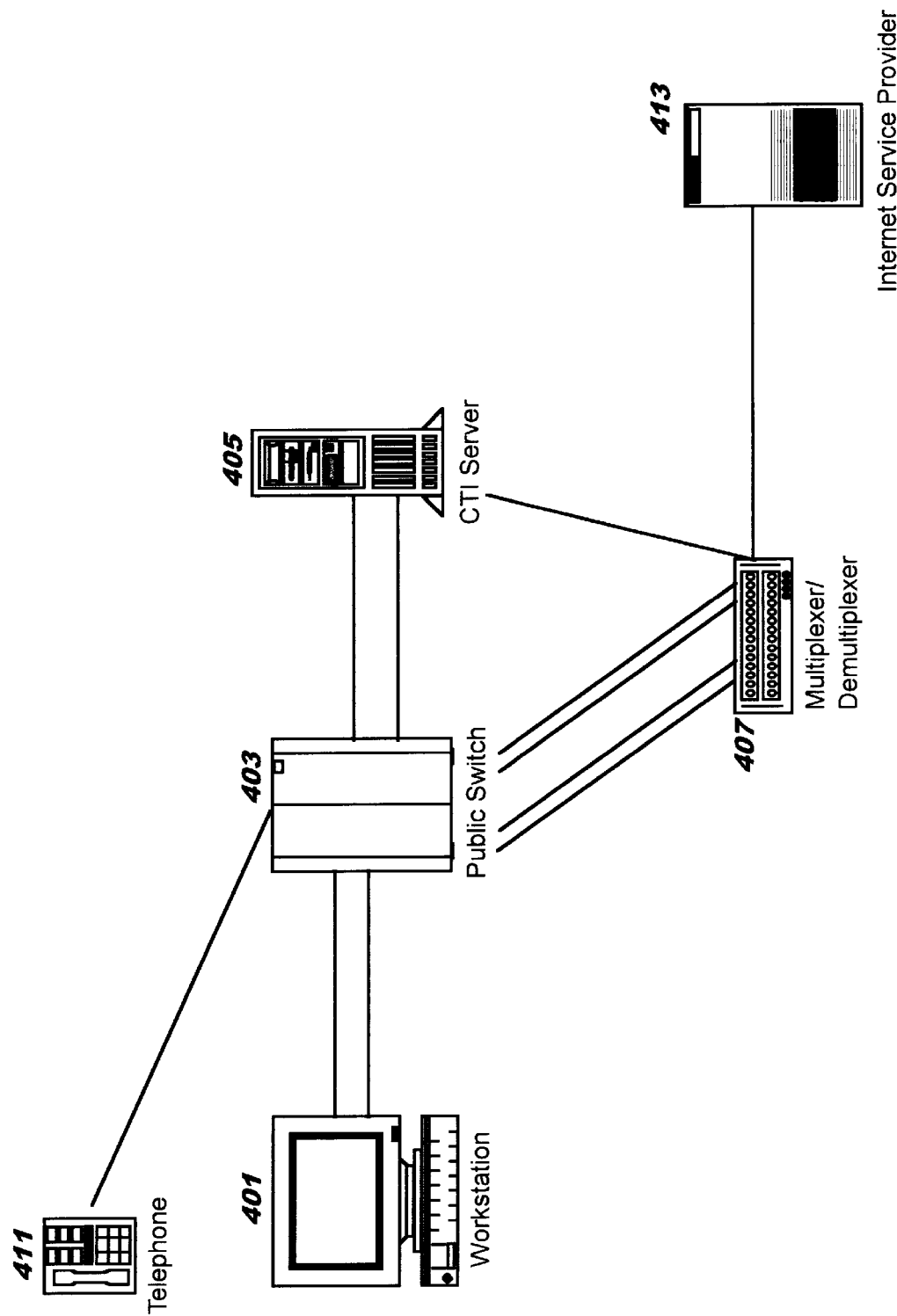
FIG. 4 is a diagram of a system containing an embodiment of the present invention.

FIG. 5 depicts a configuration similar to that of FIG. 4 except that additional connections are multiplexed to the workstation through the black box. The computer user 501 executes a dial to the central switch 503 for connection to the data service provider 511, the central switch 503 for the computer user then issues a request to the CTI server 507 requesting instructions on connecting to the data service provider 511. The CTI server 507, recognizing that this is a request to connect to a data service provider, instructs the switch 503 to redirect the call to a telephone number representing an unoccupied port on the black box 509. The black box 509 will then establish the path using the service provider 511 and information will flow freely between the computer user 501 and the service provider 511. This flow of information from the computer user 501 and the service provider 511 is by way of the central office switch 503 and the black box 509 which have, at that time, established a control channel and a data channel both over the same physical line to the computer user 501.

A request from an external telephone caller 505 then comes in to the computer user 501 by way of the external telephone caller dialing the phone number of the computer user. A request is made from the external caller's switch 503 (which in this case is the same switch as the computer user's switch) to establish the connection. The central office switch 503 for the user's computer 501 sends a request to the CTI server 507 to provide instructions on direction of the dialing request. The CTI server 507, detecting the status of the workstation connectivity, sends a request through the black box 509, over the control channel between the black box 509 and the user computer 501 for instructions as to how to handle this call. This dialog over the control channel may also contain data concerning the call such as the caller's telephone number or caller-id. The end user's choice of how to handle the call is then forwarded from the workstation 501 through the black box 509 to the CTI server 507. If the choice is to accept the call, the CTI server 507 instructs the central switch 503 for the user computer 501 to redirect the call to a specific port id on the black box 509 that will terminate the call. At that point either the black box 509 or the CTI server 507 will answer the call on behalf of the computer user 501. At this point there are three logical channels multiplexed over the connection between the user computer 501 and the black box 509, one data channel, one voice channel and one control channel.

Referring to FIG. 6, the CTI server contains information on the assignment of the ports and associations for the black box. The phone number 601 associated with the user's computer is associated with the port number associated with the data service provider 603 and also with the port number associated with the external caller 605.

Next in the present example, the computer user 501 desires an additional connection to a second data service provider 515. The computer user 501 sends a request to the central office switch 503 requesting a session with a second data service provider 515. The central office switch 503 issues a request to the CTI server 507 requesting routing instructions for the requested connection. The CTI server 507, recognizing that the requested connection is with a data service provider, instructs the switch to redirect the call to a telephone number associated with an unoccupied port on the black box 509. Referring to FIG. 6, the requested connection is then associated with port X" 607. The black box 509 then establishes a path to the service provider 515 and the information between the computer user and the second data service provider 515 begins to be multiplexed across the physical connection. This results in four logical channels, one between the user computer 501 and the first data service provider 511, one control channel between the black box 509 and the user computer 501, one between the user computer 501 and the external telephone caller 505 and another between the computer user 501 and the second data service provider 515.

In the example of FIG. 5, a second external telephone user 513 requests a connection to the computer user 501. The second external telephone user of this example is associated with a different central office switch 517 than the computer user, therefore, the request for connection comes from the telephone user to the user's central office switch 517 to the computer user's central office switch 503 and is then handled by the CTI server 507 as in the prior connection with an external telephone user. This results in one additional association 609 in the CTI server.

While there are a limited number of embodiments listed in the application, this invention in conjunction with existing features such as phone mail and conference calling, provide a multitude of means for utilizing existing telephony hardware and software, in conjunction with a multiplexer/demultiplexer and an application program at the user's workstation, to enhance the productivity and usefulness of the existing telephone line(s) to a user's computer.

What is claimed is:

1. A method for non-disruptively receiving one or more incoming telephone calls over a telephone line while said telephone line has an existing data session between a user workstation and a data service provider, said method comprising the steps of:

establishing said existing data session between said user workstation and said data service provider using a data channel established between said user workstation and a mux/demux device over said telephone line further comprising the steps of:

executing a first dial request from said user workstation to a first central office switch, said first dial request requesting a data session with said data service provider;

sending a first request for instructions from said first central office switch, responsive to receiving said first dial request, to a computer telephony interface server (CTI);

sending a first response from said CTI to said first central office switch, responsive to said first request for instructions, instructing said first central office switch to redirect said first dial request to a first telephone number representing a first free port on said mux/demux device;

redirecting, by said first central office switch, said first dial request to said first telephone number, thereby establishing a connection between said user workstation and said mux/demux device;

establishing said data channel; and establishing a path between said user workstation and said data service provider over said data channel;

establishing a control channel between said user workstation and said first central office switch over said telephone line;

establishing a voice channel between said user workstation and said mux/demux device over said telephone line;

establishing a first incoming telephone call to said user workstation using said voice channel while said existing data session continues to operate on said data channel and retains an ability to concurrently transmit data, further comprising the steps of:

receiving a connection request at said first central office switch, said connection request issued by an external caller and requesting a telephone call to a user workstation phone number of said user workstation;

sending a second request for instructions from said first central office switch, responsive to receiving said connection request, to said CTI;

sending a third request for instructions from said CTI to said mux/demux device, said third request instructing said user workstation to ask a user of said user workstation whether to answer said requested telephone call;

forwarding said third request from said mux/demux device to said user workstation on said control channel;

accepting a response regarding answering said requested telephone call from said user at said user workstation;

sending said accepted response from said user workstation to said mux/demux device on said control channel;

forwarding said accepted response from said mux/demux device to said CTI on said control channel; and completing said requested telephone call when said accepted response indicates that said requested telephone call is to be answered, further comprising the steps of:

sending a second response from said CTI to said first central office switch, instructing said first central office switch to redirect said connection request to one of a second telephone number or a port identifier representing a second free port on said mux/demux device;

redirecting, by said first central office switch, said connection request to said second telephone number or said port identifier; and answering, by either of said mux/demux device or said first central office switch, said redirected connection request;

communicating on said first incoming telephone call using said voice channel while said existing data session on said data channel continues to concurrently operate and transmit data;

routing information from said data channel, said control channel, and said voice channel through said mux/demux device to manage transmission of information to said user workstation; and retaining an ability to accept a subsequent incoming telephone call on said telephone line.

2. The method as claimed in claim 1, wherein, prior to the step of said CTI server sending said first response, said CTI server contacts said mux/demux device to determine said first telephone number and said first free port number.

3. The method as claimed in claim 1, wherein said third request for instructions further comprises one or both of: (1) a caller's phone number of said external caller and (2) an identification of said external caller.

4. The method as claimed in claim 1, wherein said CTI maintains ongoing information as to a status of connectivity of said user workstation.

5. The method as claimed in claim 1, further comprising the steps of:

demultiplexing, in said user workstation, information received at said user workstation on said data channel, said voice channel, and said control channel;

multiplexing, in said user workstation, information to be transmitted from said user workstation on said data channel, said voice channel, and said control channel;

demultiplexing, in said mux/demux device, information received on said data channel, said voice channel, and said control channel; and multiplexing, in said mux/demux device, information to be sent over said data channel, said voice channel, and said control channel.

6. A method for non-disruptively receiving an incoming telephone call over a telephone line while said telephone line has an existing data session between a user workstation and a data service provider, said method comprising the steps of:

establishing said existing data session between said user workstation and said data service provider using a data channel established between said user workstation and a mux/demux device over said telephone line, further comprising the steps of:

executing a first dial request from said user workstation to a first central office switch, said first dial request requesting a data session with said data service provider;

sending a first request for instructions from said first central office switch, responsive to receiving said first dial request, to a computer telephony interface server (CTI);

sending a first response from said CTI to said first central office switch, responsive to said first request for instructions, instructing said first central office switch to redirect said first dial request to a first telephone number representing a first free port on said mux/demux device;

redirecting, by said first central office switch, said first dial request to said first telephone number, thereby establishing a connection between said user workstation and said mux/demux device;

establishing said data channel; and establishing a path between said user workstation and said data service provider over said data channel;

establishing a control channel between said user workstation and said first central office switch over said telephone line;

establishing a voice channel between said user workstation and said mux/demux device using said telephone line;

establishing said incoming telephone call to said user workstation on said voice channel while said existing data session continues to operate on said data channel and retains an ability to concurrently transmit data, further comprising the steps of:

receiving a connection request at a second central office switch, said connection request issued by an external caller and requesting a telephone call to a user workstation phone number of said user workstation;

forwarding said connection request from said second central office switch to said first central office switch;

sending a second request for instructions from said first central office switch, responsive to receiving said connection request, to said CTI;

sending a third request for instructions from said CTI to said mux/demux device, said third request instructing said user workstation to ask a user of said user workstation whether to answer said requested telephone call;

forwarding said third request from said mux/demux device to said user workstation on said control channel;

accepting a response regarding answering said requested telephone call from said user at said user workstation;

sending said accepted response from said user workstation to said mux/demux device on said control channel;

forwarding said accepted response from said mux/demux device to said CTI on said control channel; and completing said requested telephone call when said accepted response indicates that said requested telephone call is to be answered, further comprising the steps of:

sending a second response from said CTI to said first central office switch, instructing said first central office switch to redirect said connection request to one of a second telephone number or a port identifier representing a second free port on said mux/demux device;

redirecting, by said first central office switch, said connection request to said second telephone number or said port identifier; and answering, by either of said mux/demux device or said first central office switch, said redirected connection request; and communicating on said incoming telephone call using said voice channel while said existing data session on said data channel continues to concurrently operate and transmit data.

7. A telephone communications system for non-disruptively receiving one or more incoming telephone calls over a telephone line while said telephone line has an existing data session between a user workstation and a data service provider, said system comprising:

means for establishing said existing data session between said user workstation and said data service provider using a data channel established between said user workstation and a mux/demux device over said telephone line, further comprising:

means for executing a first dial request from said user workstation to a first central office switch, said first dial request requesting a data session with said data service provider;

means for sending a first request for instructions from said first central office switch, responsive to receiving said first dial request, to a computer telephony interface server (CTI);

means for sending a first response from said CTI to said first central office switch, responsive to said first request for instructions, instructing said first central office switch to redirect said first dial request to a first telephone number representing a first free port on said mux/demux device;

means for redirecting, by said first central office switch, said first dial request to said first telephone number, thereby establishing a connection between said user workstation and said mux/demux device;

means for establishing said data channel; and means for establishing a path between said user workstation and said data service provider over said data channel;

means for establishing a control channel between said user workstation and said first central office switch over said telephone line;

means for establishing a voice channel between said user workstation and said mux/demux device over said telephone line;

means for establishing said incoming telephone call to said user workstation using said voice channel while said existing data session continues to operate on said data channel and retains an ability to concurrently transmit data, further comprising:

means for receiving a connection request at said first central office switch, said connection request issued by an external caller and requesting a telephone call to a user workstation phone number of said user workstation;

means for sending a second request for instructions from said first central office switch, responsive to receiving said connection request, to said CTI;

means for sending a third request for instructions from said CTI to said mux/demux device, said third request instructing said user workstation to ask a user of said user workstation whether to answer said requested telephone call;

means for forwarding said third request from said mux/demux device to said user workstation on said control channel;

means for accepting a response regarding answering said requested telephone call from said user at said user workstation;

means for sending said accepted response from said user workstation to said mux/demux device on said control channel;

means for forwarding said accepted response from said mux/demux device to said CTI on said control channel; and means for completing said requested telephone call when said accepted response indicates that said requested telephone call is to be answered, further comprising:

means for sending a second response from said CTI to said first central office switch, instructing said first central office switch to redirect said connection request to one of a second telephone number or a port identifier representing a second free port on said mux/demux device;

means for redirecting, by said first central office switch, said connection request to said second telephone number or said port identifier; and means for answering, by either of said mux/demux device or said first central office switch, said redirected connection request; and means for communicating on said incoming telephone call using said voice channel while said existing data session on said data channel continues to concurrently operate and transmit data.

8. The system as claimed in claim 7, wherein said mux/demux device resides within said first central office switch.

9. The system as claimed in claim 7, wherein said mux/demux device resides in a black box separate from said first central office switch.

10. The system as claimed in claim 7, further comprising:

means for receiving, at said first central office switch, one or more additional incoming telephone call requests;

means for establishing an additional voice channel between said user workstation and said mux/demux device over said telephone line for each of said additional incoming requests; and means for repeating said means for establishing said incoming telephone call for each of said additional incoming telephone call requests; and wherein said means for communicating on said telephone call further comprises means for communicating on each of said additional incoming telephone calls using said additional voice channels.

11. A computer program product for non-disruptively receiving an incoming telephone call over a telephone line while said telephone line has one or more existing data sessions between a user workstation and one or more data service providers said computer program product embodied on a computer-readable medium in a telephone communications system and comprising:

computer-readable program code means for establishing a first data session between said user workstation and a first data service provider using a first data channel established between said user workstation and a mux/demux device over said telephone line, further comprising:

computer-readable program code means for executing a first dial request from said user workstation to a first central office switch, said first dial request requesting a data session with said first data service provider;

computer-readable program code means for sending a first request for instructions from said first central office switch, responsive to receiving said first dial request, to a computer telephony interface server (CTI);

computer-readable program code means for sending a first response from said CTI to said first central office switch, responsive to said first request for instructions, instructing said first central office switch to redirect said first dial request to a first telephone number representing a first free port on said mux/demux device;

computer-readable program code means for redirecting, by said first central office switch, said first dial request to said first telephone number, thereby establishing a connection between said user workstation and said mux/demux device;

computer-readable program code means for establishing said first data channel; and computer-readable program code means for establishing a first path between said user workstation and said first data service provider over said first data channel;

computer-readable program code means for establishing a control channel between said user workstation and said first central office switch over said telephone line;

computer-readable program code means for establishing a voice channel between said user workstation and said mux/demux device over said telephone line;

computer-readable program code means for establishing said incoming telephone call to said user workstation using said voice channel while said existing data session continues to operate on said first data channel and retains an ability to concurrently transmit data, further comprising:

computer-readable program code means for receiving a connection request at said first central office switch, said connection request issued by an external caller and requesting a telephone call to a user workstation phone number of said user workstation;

computer-readable program code means for sending a second request for instructions from said first central office switch, responsive to receiving said connection request, to said CTI;

computer-readable program code means for sending a third request for instructions from said CTI to said mux/demux device, said third request instructing said user workstation to ask a user of said user workstation whether to answer said requested telephone call;

computer-readable program code means for forwarding said third request from said mux/demux device to said user workstation on said control channel;

computer-readable program code means for accepting a response regarding answering said requested telephone call from said user at said user workstation;

computer-readable program code means for sending said accepted response from said user workstation to said mux/demux device on said control channel;

computer-readable program code means for forwarding said accepted response from said mux/demux device to said CTI on said control channel; and computer-readable program code means for completing said requested telephone call when said accepted response indicates that said requested telephone call is to be answered, further comprising:

computer-readable program code means for sending a second response from said CTI to said first central office switch, instructing said first central office switch to redirect said connection request to one of a second telephone number or a port identifier representing a second free port on said mux/demux device;

computer-readable program code means for redirecting, by said first central office switch, said connection request to said second telephone number or said port identifier; and computer-readable program code means for answering, by either of said mux/demux device or said first central office switch, said redirected connection request; and computer-readable program code means for communicating on said incoming telephone call using said voice channel while said existing data session on said first data channel continues to concurrently operate and transmit data.

12. The computer program product as claimed in claim 11, wherein said mux/demux device resides within said first central office switch.

13. The computer program product as claimed in claim 11, wherein said mux/demux device resides in a black box separate from said first central office switch.

14. The computer program product as claimed in claim 11, further comprising:

computer-readable program code means for establishing, from said user workstation, one or more additional data sessions, further comprising:

computer-readable program code means for establishing an additional data channel between said user workstation and a mux/demux device over said telephone line for each of said additional data sessions; and computer-readable program code means for repeating execution of said computer-readable program code means for establishing said first data session using said additional data channels;

computer-readable program code means for demultiplexing, in said user workstation, information received at said user workstation on said first data channel, said additional data channels, said voice channel, and said control channel; and computer-readable program code means for multiplexing, in said user workstation, information to be transmitted from said user workstation on said first data channel, said additional data channels, said voice channel, and said control channel.

* * * * *